(12) United States Patent
Monfort

(10) Patent No.: US 8,169,115 B1
(45) Date of Patent: May 1, 2012

(54) MOTOR DISTRIBUTOR SYSTEM

(76) Inventor: Edward Riggs Monfort, Palm Harbor, FL (US)

( * ) Notice: Subject to any disclaimer, the term of this patent is extended or adjusted under 35 U.S.C. 154(b) by 605 days.

(21) Appl. No.: 12/291,720

(22) Filed: Nov. 13, 2008

Related U.S. Application Data

(60) Provisional application No. 61/194,304, filed on Sep. 26, 2008.

(51) Int. Cl.
*H02K 47/00* (2006.01)
*F02N 15/00* (2006.01)
*B60K 6/00* (2007.10)

(52) U.S. Cl. ....... 310/112; 310/75 R; 74/7 E; 180/65.25

(58) Field of Classification Search ................ 310/75 R, 310/98, 112; 74/7 A, 7 E; 180/65.25, 67.27–67.28; 475/153, 265; 477/3
See application file for complete search history.

(56) References Cited

U.S. PATENT DOCUMENTS

| | | | | |
|---|---|---|---|---|
| 3,541,363 A | * | 11/1970 | Vettermann et al. | 310/49.17 |
| 3,858,308 A | * | 1/1975 | Peterson | 29/598 |
| 4,031,421 A | * | 6/1977 | Geiger | 310/112 |
| 4,039,205 A | * | 8/1977 | Castanier | 280/124.109 |
| 4,130,769 A | * | 12/1978 | Karube | 310/46 |
| 4,373,147 A | * | 2/1983 | Carlson, Jr. | 318/48 |
| 4,531,072 A | * | 7/1985 | Weaver et al. | 310/162 |
| 4,635,489 A | * | 1/1987 | Imamura et al. | 74/7 E |
| 4,654,577 A | * | 3/1987 | Howard | 322/28 |
| 4,874,975 A | * | 10/1989 | Hertrich | 310/186 |
| 4,891,996 A | * | 1/1990 | Isozumi et al. | 74/6 |
| 4,896,550 A | * | 1/1990 | Hikichi et al. | 74/6 |
| 5,562,566 A | * | 10/1996 | Yang | 477/3 |
| 5,704,250 A | * | 1/1998 | Black | 74/89.3 |
| 5,838,085 A | * | 11/1998 | Roesel et al. | 310/113 |
| 6,356,817 B1 | * | 3/2002 | Abe | 701/22 |
| 6,789,438 B2 | * | 9/2004 | Tanaka et al. | 74/7 E |
| 7,131,275 B2 | * | 11/2006 | Gustafson | 60/788 |

FOREIGN PATENT DOCUMENTS

| | | | | |
|---|---|---|---|---|
| JP | 62131822 A | * | 6/1987 | |
| JP | 2006230142 A | * | 8/2006 | |

* cited by examiner

*Primary Examiner* — Tran Nguyen

(57) ABSTRACT

A cylindrical drive shaft has forward and rearward ends. A fixed cylindrical housing receives the drive shaft, the housing having forward and rearward ends. An axial flux permanent magnet motor encompasses the drive shaft within the housing. The axial flux permanent magnet motor has a radially exterior cylinder fixedly secured to the housing and a radially interior cylinder secured to the drive shaft for rotation therewith. Each axial flux permanent magnet motor has windings coupled to the exterior cylinder. Each axial flux permanent magnet motor has a permanent magnet fixedly coupled to the interior cylinder. Electrical lines have lower ends coupled to the windings and upper ends adapted to be coupled to a source of potential for energizing the axial flux permanent magnet motors.

3 Claims, 3 Drawing Sheets

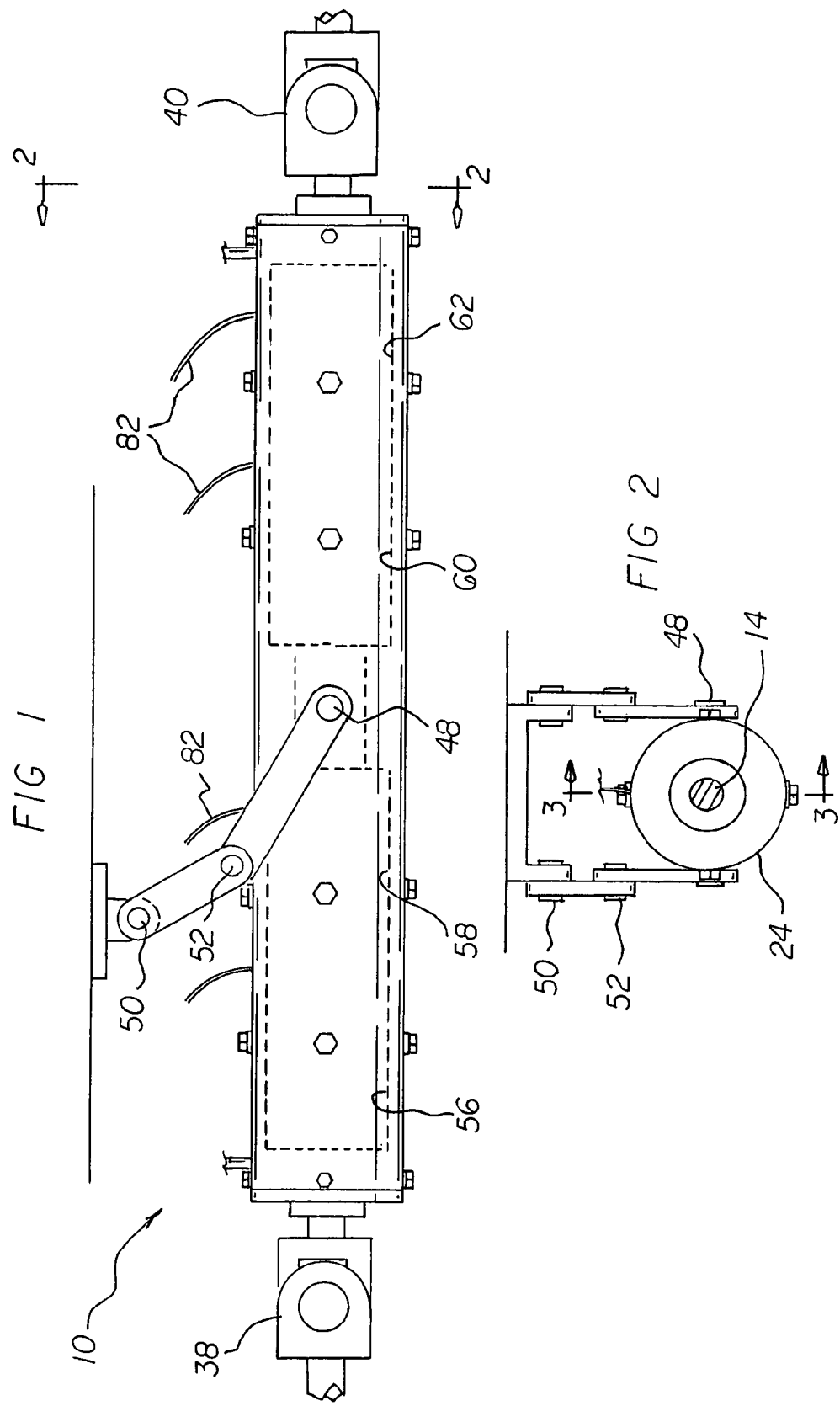

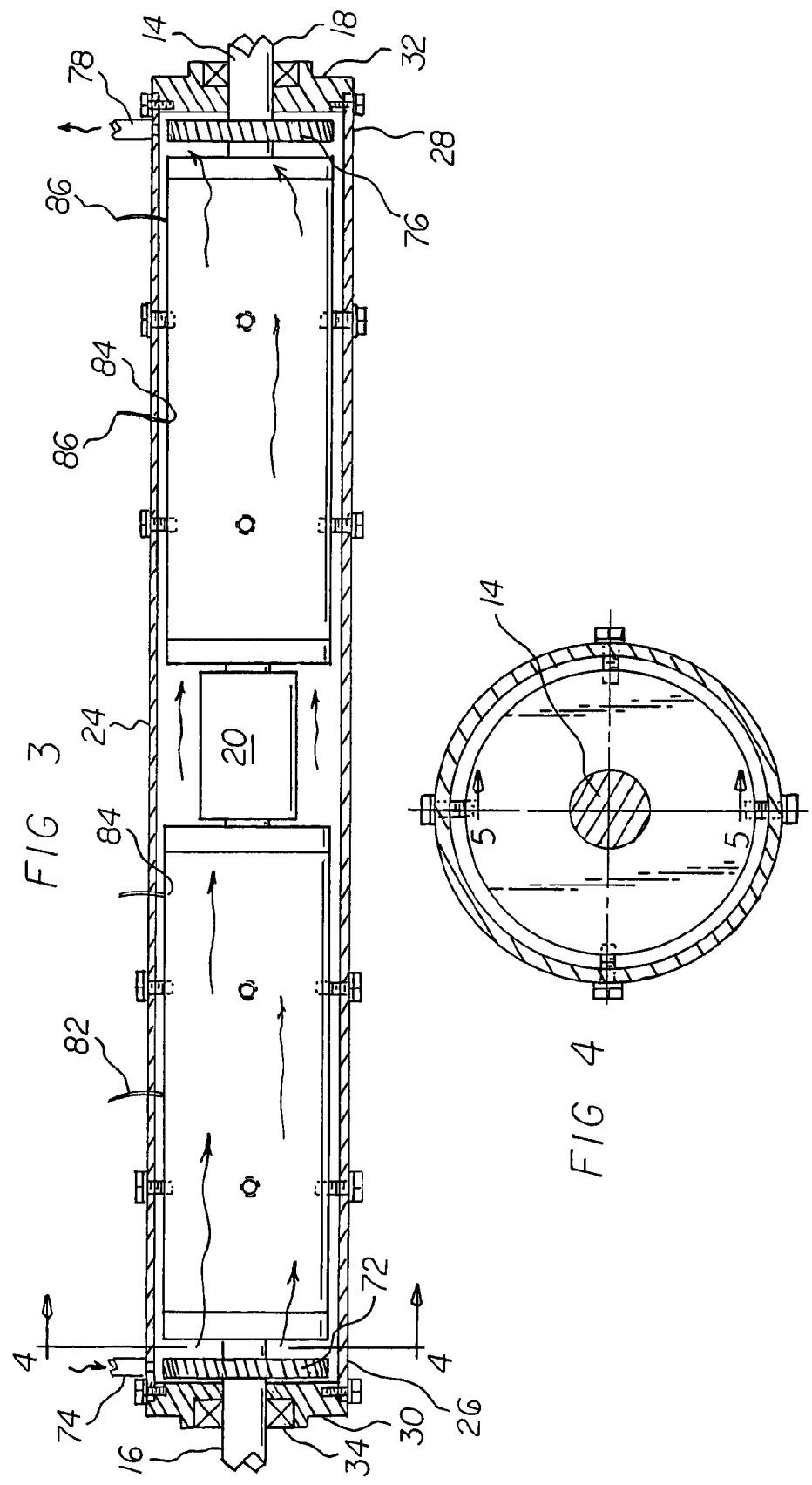

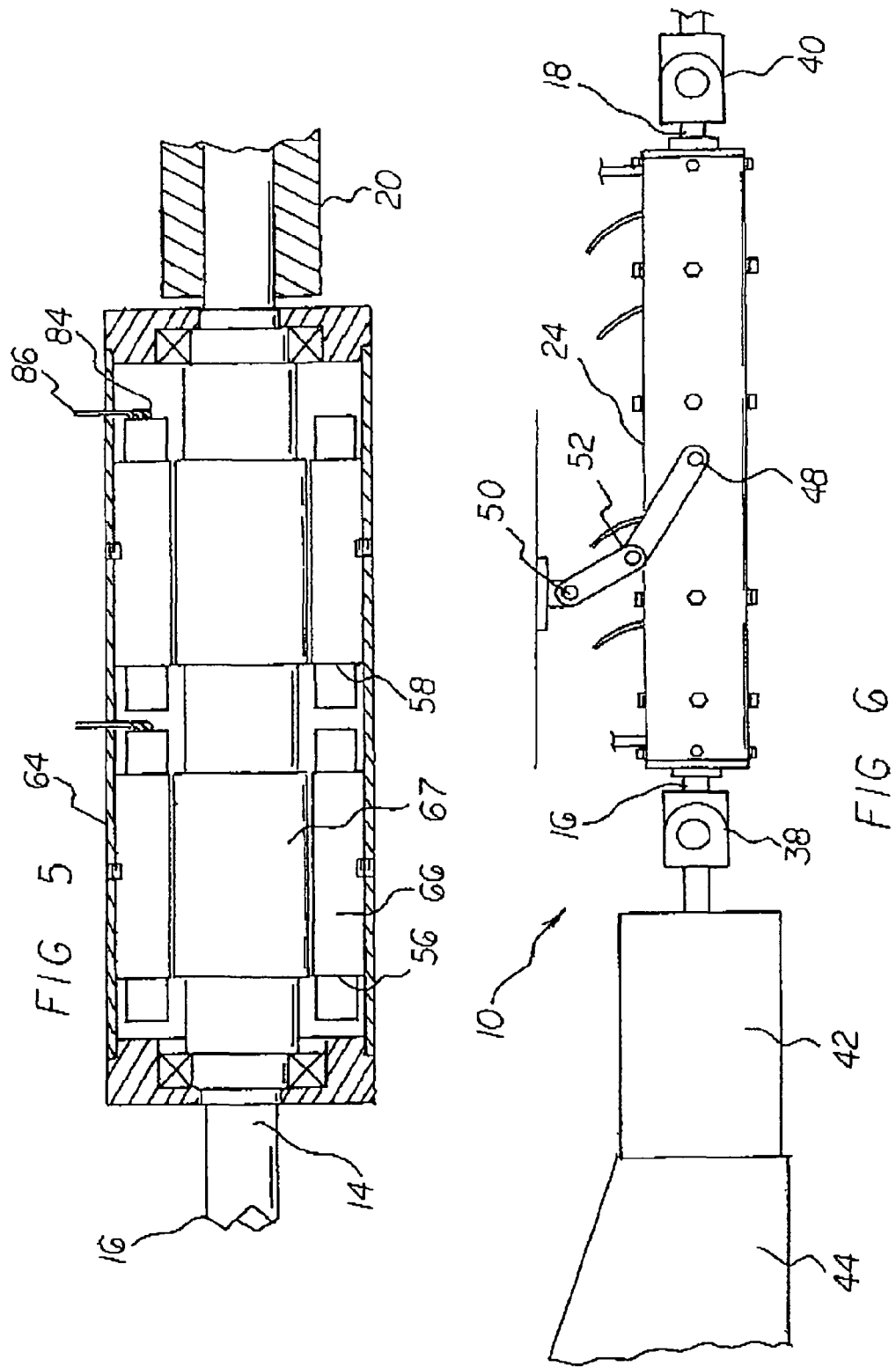

MOTOR DISTRIBUTOR SYSTEM

RELATED APPLICATION

The present application is based upon pending U.S. Provisional Application No. 61/194,304 filed Sep. 26, 2008, the subject matter of which is incorporated herein by reference.

BACKGROUND OF THE INVENTION

Field of the Invention

The present invention relates to a motor distributor system and more particularly pertains to powering a vehicle by transmitting rotational energy through a drive shaft from an internal combustion engine and/or one or more axial flux permanent magnet motors, the powering being achieved in an energy conserving manner which is safe, ecological, efficient and economical.

A vehicle equipped with a motor distributor system of the present invention includes a drive shaft which is adapted to be powered solely by an internal combustion engine. In the alternative the drive shaft is adapted to be powered solely by the axial flux permanent magnetic motor or motors while the internal combustion engine is idling. Lastly, in another alternative, the drive shaft is adapted to be powered jointly by the combination of the internal combustion engine and the axial flux permanent magnetic motor or motors. This combination mode can double the horsepower of the vehicle but not the engine. The axial flux permanent magnetic motor or motors are adapted to provide extra power like a supercharger. A user may be racing the car using full power from a 300 horse power internal combustion engine. When the user activates the axial flux permanent magnetic motor or motors, a supplemental 300 horsepower is provided whereby the vehicle is being powered by 600 horsepower. More importantly, however, the system of the present invention conserves energy by increasing the fuel efficiency of a vehicle equipped with such system.

SUMMARY OF THE INVENTION

In view of the disadvantages inherent in the known types of motor distributor systems of known designs and configurations now present in the prior art, the present invention provides an improved motor distributor system. As such, the general purpose of the present invention, which will be described subsequently in greater detail, is to provide a new and improved motor distributor system and method which has all the advantages of the prior art and none of the disadvantages.

To attain this, the present invention essentially comprises a motor distributor system. First provided is a cylindrical drive shaft. The drive shaft has a central axis. The drive shaft is rotatable around its central axis. The drive shaft has a forward end. The drive shaft has a rearward end. A center is provided between the forward and rearward ends. The drive shaft is discontinuous at its center. In this manner a forward portion and a rearward portion are formed. A connector is provided. The connector joins the forward and rearward portions.

In an alternate embodiment of the invention, a continuous drive shaft is utilized. Such continuous drive shaft is preferred for smaller, lighter vehicles and vehicles with smaller internal combustion engines, vehicles requiring less power. It should be understood, therefore, that any number of axial flux permanent magnet motors, from a single one to a large number, could be readily utilized as a function of the vehicle.

A fixed cylindrical housing is provided. The housing has a forward end. The housing has a rearward end. The housing has a central axis. The central axis is coextensive with the central axis of the drive shaft. The forward end of the drive shaft extends forwardly of the forward end of the housing. The rearward end of the drive shaft extends rearwardly of the rearward end of the housing. The housing has a forward end cap. The forward end cap is removably coupled to the forward end of the housing. The housing has a rearward end cap. The rearward end cap is removably coupled to the forward end of the housing. Each end cap has a central aperture. A bearing is provided. The bearing rotatably supports the drive shaft. The housing is fabricated of a rigid material. The rigid material is chosen from the class of rigid materials. The class of rigid materials includes an aircraft grade aluminum, other metals and composite materials.

Provided next is a forward universal coupling. The forward universal coupling is secured to the forward end of the drive shaft. A rearward universal coupling is provided. The rearward universal coupling is secured to the rearward end of the drive shaft. The rearward universal coupling is adapted to couple to a rear axle and driven wheels. A clutch is provided as an option. The clutch, in the preferred embodiment, is provided forwardly of the forward universal coupling. An internal combustion engine is provided. The internal combustion engine is provided forwardly of the clutch. In this manner activation of the internal combustion engine is adapted to rotate the drive shaft. Further in this manner the rear axle and driven wheels are powered.

A support linkage is provided. The support linkage has lower ends. The lower ends are coupled to the housing at a central region. The support linkage has upper ends. The upper ends are adapted to be coupled to a frame portion of the vehicle. The support linkage has resilient joints. The resilient joints are provided between the upper and lower ends. In this manner the housing functions as a brace and also allows the absorption of shocks and vibration during use.

A forward and a rearward axial flux permanent magnet motor are provided next. The motors encompass the forward and rearward portions of the drive shaft within the housing. Each axial flux permanent magnet motor has a radially exterior cylinder. The radially exterior cylinder is fixedly secured to the housing. Each axial flux permanent magnet motor has a radially interior cylinder. The radially interior cylinder is secured to the drive shaft for rotation therewith. Each axial flux permanent magnet motor has windings. The windings are coupled to the exterior cylinder. Each axial flux permanent magnet motor has a permanent magnet. The permanent magnet is fixedly coupled to the interior cylinder. The interior and exterior cylinders are fabricated of a rigid, electrically insulating material. The rigid, electrically insulating material is chosen from the class of electrically insulating materials. The class of electrically insulating materials includes composite materials and plastic materials.

It should be appreciated that some axial flux permanent magnet motors have windings and some are made of composite material whereas the magnets are placed into the composite using windings only on one side. In addition, means other than windings are adapted to be utilized for conducting electricity to the magnets. It should be also appreciated that the axial flux permanent magnet motors are adapted to be single phase or 3 phase. Further, the axial flux permanent magnet motors are adapted to be AC or DC.

Further provided is a forward fan. The forward fan is provided within the housing adjacent to the forward end cap. An air inlet is provided. The air inlet is provided within the housing adjacent to the forward fan. A rearward fan is provided. The rearward fan is provided within the housing adjacent to the rearward end cap. An air outlet is provided. The air outlet is provided in the housing adjacent to the rearward fan.

Provided last are electrical lines. The electrical lines have lower ends. The lower ends are coupled to the windings in the exterior cylinders. The electrical lines have upper ends. The upper ends are adapted to be coupled to a source of electrical potential. The electrical potential is adapted to energize the axial flux permanent magnet motors. Powering of the vehicle is by transmitting rotational energy through the drive shaft from the internal combustion engine and/or one or more axial flux permanent magnet motors.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor distributor system which has all of the advantages of the prior art motor distributor systems of known designs and configurations and none of the disadvantages.

It is another object of the present invention to provide a new and improved motor distributor system which may be easily and efficiently manufactured and marketed.

It is further object of the present invention to provide a new and improved motor distributor system which is of durable and reliable constructions.

An even further object of the present invention is to provide a new and improved motor distributor system which is susceptible of a low cost of manufacture with regard to both materials and labor, and which accordingly is then susceptible of low prices of sale to the consuming public, thereby making such motor distributor system economically available to the buying public.

Even still another object of the present invention is to provide a motor distributor system for powering a vehicle by transmitting rotational energy through a drive shaft from an internal combustion engine and/or one or more axial flux permanent magnet motors, the powering being achieved in an energy efficient manner which is safe, ecological, efficient and economical.

Lastly, it is an object of the present invention to provide a new and improved motor distributor system. A cylindrical drive shaft has forward and rearward ends. A fixed cylindrical housing receives the drive shaft, the housing having forward and rearward ends. An axial flux permanent magnet motor encompasses the drive shaft within the housing. The axial flux permanent magnet motor has a radially exterior cylinder fixedly secured to the housing and a radially interior cylinder secured to the drive shaft for rotation therewith. Each axial flux permanent magnet motor has windings coupled to the exterior cylinder. Each axial flux permanent magnet motor has a permanent magnet fixedly coupled to the interior cylinder. Electrical lines have lower ends coupled to the windings and upper ends adapted to be coupled to a source of potential for energizing the axial flux permanent magnet motors. Such motors are adapted to include brushes but in the preferred embodiment the motors are brushless.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a motor distributor system constructed in accordance with the principles of the present invention.

FIG. 2 is a cross sectional view taken along line 2-2 of FIG. 1.

FIG. 3 is a cross sectional view taken along line 3-3 of FIG. 2.

FIG. 4 is a cross sectional view taken along line 4-4 of FIG. 3.

FIG. 5 is a cross sectional view taken along line 5-5 of FIG. 4.

FIG. 6 is a side elevational view similar to FIG. 1 but showing additional components.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved motor distributor system embodying the principles and concepts of the present invention and generally designated by the reference numeral 10 will be described.

The present invention, the motor distributor system 10 is comprised of a plurality of components. Such components in their broadest context include cylindrical drive shaft, a fixed cylindrical housing, an axial flux permanent magnet motor, and electrical lines. Such components are individually configured and correlated with respect to each other so as to attain the desired objective.

First provided is a cylindrical drive shaft 14. The drive shaft has a central axis. The drive shaft is rotatable around its central axis. The drive shaft has a forward end 16. The drive shaft has a rearward end 18. A center is provided between the forward and rearward ends. The drive shaft is discontinuous at its center. In this manner a forward portion and a rearward portion are formed. A connector 20 is provided. The connector joins the forward and rearward portions.

A fixed cylindrical housing 24 is provided. The housing has a forward end 26. The housing has a rearward end 28. The housing has a central axis. The central axis is coextensive with the central axis of the drive shaft. The forward end of the drive shaft extends forwardly of the forward end of the housing. The rearward end of the drive shaft extends rearwardly of the rearward end of the housing. The housing has a forward end cap 30. The forward end cap is removably coupled to the forward end of the housing. The housing has a rearward end cap 32. The rearward end cap is removably coupled to the forward end of the housing. Each end cap has a central aperture. A bearing 34 is provided. The bearing rotatably supports the drive shaft. The housing is fabricated of a rigid material. The rigid material is chosen from the class of rigid materials. The class of rigid materials includes an aircraft grade aluminum, other metals and composite materials.

Provided next is a forward universal coupling 38. The forward universal coupling is secured to the forward end of the drive shaft. A rearward universal coupling 40 is provided. The rearward universal coupling is secured to the rearward end of the drive shaft. The rearward universal coupling is adapted to couple to a rear axle and driven wheels. A clutch 42 is optionally provided. The clutch is provided forwardly of the forward universal coupling. An internal combustion engine 44 is provided. The internal combustion engine is provided forwardly of the clutch. In this manner activation of the internal combustion engine is adapted to rotate the drive shaft. Further in this manner the rear axle and driven wheels are powered.

A support linkage is provided. The support linkage has lower ends 48. The lower ends are coupled to the housing at a central region. The support linkage has upper ends 50. The upper ends are adapted to be coupled to a frame portion of the vehicle. The support linkage has resilient joints 52. The resilient joints are provided between the upper and lower ends. In this manner the housing is allowed to absorb shocks and vibration during use.

A single housing and support linkage is illustrated as the preferred embodiment. It should be understood, however, that any number of housings with their contained axial flux permanent magnet motors is adapted to be utilized in a single vehicle with their placement being as needed for the particular application.

A forward and a rearward axial flux permanent magnet motor 56, 58, 60, 62 are provided next. Such motors are brushless in the preferred embodiment, but the motors, in an alternate embodiment of the invention, are adapted to be of the type to utilize brushes. The motors encompass the forward and rearward portions of the drive shaft within the housing. Each axial flux permanent magnet motor has a radially exterior cylinder 64. The radially exterior cylinder is fixedly secured to the housing. Each axial flux permanent magnet motor has a radially interior cylinder 66. The radially interior cylinder is secured to the drive shaft for rotation therewith. Each axial flux permanent magnet motor has windings. The windings are coupled to the exterior cylinder. Each axial flux permanent magnet motor has a permanent magnet. The permanent magnet is fixedly coupled to the interior cylinder. The interior and exterior cylinders are fabricated of a rigid, electrically insulating material. The rigid, electrically insulating material is chosen from the class of electrically insulating materials. The class of electrically insulating materials includes composite materials and plastic materials.

With regard to an alternate embodiment of the invention, it should be understood that some axial flux permanent magnet motors have windings and some are made of composite material whereas the magnets are placed into the composite using windings only on one side. As such, means other than windings are adapted to be utilized for conducting electricity to the magnets.

Further provided is a forward fan 72. The forward fan is provided within the housing adjacent to the forward end cap. An air inlet 74 is provided. The air inlet is provided within the housing adjacent to the forward fan. A rearward fan 76 is provided. The rearward fan is provided within the housing adjacent to the rearward end cap. An air outlet 78 is provided. The air outlet is provided in the housing adjacent to the rearward fan.

Provided last are electrical lines 82. The electrical lines have lower ends 84. The lower ends are coupled to the windings in the exterior cylinders. The electrical lines have upper ends 86. The upper ends are adapted to be coupled to a source of electrical potential. The electrical potential is adapted to energize the axial flux permanent magnet motors. In this manner the load on the internal combustion engine is relieved for increased efficiency of the system.

Note is taken that the axial flux permanent magnet motors are adapted to be single phase or 3 phase. Further, the axial flux permanent magnet motors are adapted to be AC or DC.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motor distributor system for powering a vehicle by transmitting rotational energy through a drive shaft, in a first mode, from an internal combustion engine and, in a second mode, from axial flux permanent magnet motors and, in a third mode, from the combination of an internal combustion engine and axial flux permanent magnet motors, the powering being achieved in an energy conserving manner that is safe, ecological, efficient and economical, the system comprising, in combination:

a cylindrical drive shaft having a central axis, the drive shaft having a central axis and being rotatable around the central axis, the drive shaft having a forward end and a rearward end with a center there between, the drive shaft being discontinuous at the center thus forming a forward portion and a rearward portion with a connector joining the forward and rearward portions;

a fixed cylindrical housing having a forward end and a rearward end, the housing having a central axis coextensive with the central axis of the drive shaft, the forward end of the drive shaft extending forwardly of the forward end of the housing, the rearward end of the drive shaft extending rearwardly of the rearward end of the housing, a forward end cap removably coupled to the forward end of the housing, a rearward end cap removably coupled to the forward end of the housing, a central aperture in each end cap with a bearing rotatably supporting the drive shaft, the housing being fabricated of a rigid material chosen from the class of rigid materials including an aircraft grade aluminum, other metals and composite materials;

a forward universal coupling secured to the forward end of the drive shaft, a rearward universal coupling secured to the rearward end of the drive shaft, the rearward universal coupled to a rear axle and driven wheels, an optional clutch forwardly of the forward universal coupling with an internal combustion engine forwardly of the clutch, activation of the internal combustion engine rotatably coupling the drive shaft to power the rear axle and driven wheels;

a support linkage having lower ends coupled to the housing at a central region, the support linkage having upper ends coupled to a frame portion of the vehicle, the support linkage having resilient joints between the upper and lower ends for allowing the housing to absorb shocks and vibration during use;

a forward and a rearward axial flux permanent magnet motor encompassing the forward and rearward portions of the drive shaft within the housing, each axial flux permanent magnet motor having a radially exterior cylinder fixedly secured to the housing and a radially interior cylinder secured to the drive shaft for rotation therewith, each axial flux permanent magnet motor having windings coupled to the exterior cylinder, each axial flux permanent magnet motor having a permanent magnet fixedly coupled to the interior cylinder, the interior and exterior cylinders being fabricated of a rigid, electrically insulating material chosen from the class of electrically insulating materials including composite materials and plastic materials;

a forward fan within the housing adjacent to the forward end cap with an air inlet in the housing adjacent to the forward fan, a rearward fan within the housing adjacent to the rearward end cap with an air outlet in the housing adjacent to the rearward fan; and electrical lines having lower ends coupled to the windings in the exterior cylinders and upper ends coupled to a source of electrical potential, the electrical potential energizing the axial flux permanent magnet motors to relieve the load on the internal combustion engine for increased efficiency of the system.

2. A motor distributor system comprising:

a cylindrical drive shaft having forward and rearward ends;

a fixed cylindrical housing receiving the drive shaft, the housing having forward and rearward ends;

a plurality of axial flux permanent magnet motors encompassing the drive shaft within the housing, each axial flux permanent magnet motor having a radially exterior cylinder fixedly secured to the housing and a radially interior cylinder secured to the drive shaft for rotation therewith, each axial flux permanent magnet motor having windings coupled to the exterior cylinder, each axial flux permanent magnet motor having a permanent magnet fixedly coupled to the interior cylinder;

electrical lines having lower ends coupled to the windings and upper ends coupled to a source of potential for energizing the axial flux permanent magnet motor; and a forward universal coupling secured to the forward end of the drive shaft, a rearward universal coupling secured to the rearward end of the drive shaft, the rearward universal coupling to a rear axle and driven wheels, a clutch forwardly of the forward universal coupling with an internal combustion engine forwardly of the clutch, activation of the internal combustion engine coupling to rotate the drive shaft to power the rear axle and driven wheels.

3. A motor distributor system comprising:

a cylindrical drive shaft having forward and rearward ends;

a fixed cylindrical housing receiving the drive shaft, the housing having forward and rearward ends;

a plurality of axial flux permanent magnet motors encompassing the drive shaft within the housing, each axial flux permanent magnet motor having a radially exterior cylinder fixedly secured to the housing and a radially interior cylinder secured to the drive shaft for rotation therewith, each axial flux permanent magnet motor having windings coupled to the exterior cylinder, each axial flux permanent magnet motor having a permanent magnet fixedly coupled to the interior cylinder;

electrical lines having lower ends coupled to the windings and upper ends coupled to a source of potential for energizing the axial flux permanent magnet motor;

a support linkage having lower ends coupled to the housing at a central region, the support linkage having upper ends coupled to a frame portion of the vehicle, the support linkage having resilient joints between the upper and lower ends for allowing the housing to absorb shocks and vibration during use.

\* \* \* \* \*